United States Patent [19]

Harandi et al.

[11] Patent Number: 4,854,939
[45] Date of Patent: Aug. 8, 1989

[54] AROMATIZATION AND ETHERIFICATION PROCESS INTEGRATION

[75] Inventors: Mohsen N. Harandi, Lawrenceville; Hartley Owen, Belle Mead, both of N.J.

[73] Assignee: Mobil Oil Corporation, New York, N.Y.

[21] Appl. No.: 130,260

[22] Filed: Dec. 8, 1987

[51] Int. Cl.$^4$ .................. C10L 1/18; C07C 12/02; C07C 12/42
[52] U.S. Cl. ........................... 44/77; 585/415; 585/416; 585/417
[58] Field of Search ............... 44/53, 56, 77; 568/697; 585/415, 417, 419; 502/159

[56] References Cited

U.S. PATENT DOCUMENTS

| | | | |
|---|---|---|---|
| 3,760,024 | 9/1973 | Cahanach | 260/673 |
| 3,845,150 | 10/1974 | Yan et al. | 260/673.5 |
| 3,960,978 | 6/1976 | Givens et al. | 585/531 |
| 4,330,679 | 5/1982 | Köhler et al. | 502/159 |
| 4,350,835 | 9/1982 | Chester et al. | 585/415 |
| 4,544,776 | 10/1985 | Osterburg et al. | 568/697 |
| 4,603,225 | 7/1986 | Colaianne et al. | 568/697 |
| 4,642,402 | 2/1987 | Jensen | 585/415 |
| 4,642,404 | 2/1987 | Shihabi | 585/415 |
| 4,665,251 | 5/1987 | Chu | 585/415 |
| 4,677,235 | 6/1987 | Mowry | 585/415 |
| 4,684,757 | 8/1987 | Avidan et al. | 585/331 |

OTHER PUBLICATIONS

U.S. Ser. No. 130,256 (Docket 4610), filed Dec. 8, 1987.
U.S. Ser. No. 130,258 (Docket 4611), filed Dec. 8, 1987.
U.S. Ser. No. 130,259 (Docket 4608), filed Dec. 8, 1987.
U.S. Ser. No. 130,260 (Docket 4612), filed Dec. 8, 1987.
U.S. Ser. No. 130,261 (Docket 4609), filed Dec. 8, 1987.

Primary Examiner—William R. Dixon, Jr.
Assistant Examiner—Margaret B. Medley
Attorney, Agent, or Firm—Alexander J. McKillop; Charles J. Speciale; L. G. Wise

[57] ABSTRACT

An integrated process for the production of aromatics rich an MTBE and TAME rich high octane gasoline fractions is described. Etherifications of iso-olefins is conducted in the presence of excess methanol. Unreacted methanol is passed to a fixed, fluid or moving bed aromatization zone in contact with ZSM-5 catalyst and olefin and paraffin feedstream to produce high octane gasoline.

11 Claims, 2 Drawing Sheets

AROMATIZATION AND ETHERIFICATION PROCESS INTEGRATION

This invention relates to an integrated process for the production of high octane gasoline. In particular, the invention relates to the integration of etherification to produce methyl tertiary alkyl ethers with aromatic processes to produce improved octane gasoline fractions.

BACKGROUND

In recent years, a major technical challenge presented to the petroleum refining industry has been the requirement to establish alternate processes for manufacturing high octane gasoline in view of the regulated requirement to eliminate lead additives as octane enhancers as well as the development of more efficient, higher compression ratio gasoline engines requiring higher octane fuel. To meet these requirements the industry has developed non-lead octane boosters and has reformulated high octane gasoline to incorporate an increased fraction of aromatics. While these and other approaches will fully meet the technical requirements of regulations requiring elimination of gasoline lead additives and allow the industry to meet the burgeoning market demand for high octane gasoline, the economic impact on the cost of gasoline is significant. Accordingly, workers in the field have intensified their effort to discover new processes to manufacture the gasoline products required by the market place. One important focus of that research is new processes to produce high octane gasolines blended with lower aliphatic alkyl ethers as octane boosters and supplementary fuels. $C_5$–$C_7$ methyl alkyl ethers, especially methyl tertiary butyl ether (MTBE) and tertiary amyl methyl ether (TAME) have been found particularly useful for enhancing gasoline octane. Therefore, improvements to the processes related to the production of these ethers are matters of high importance and substantial challenge to research workers in the petroleum refining arts.

It is known that isobutylene may be reacted with methanol over an acidic catalyst to provide methyl tertiary butyl ether (MTBE) and isoamylenes may be reacted with methanol over an acidic catalyst to produce tertiary-amyl methyl ether (TAME). In these etherification processes a problem of major importance is the separation of methanol from the etherification reaction product due to the proclivity of methanol to form a very dilute azeotropic mixture with hydrocarbons and the strong solubility of methanol in both water and hydrocarbons. Due largely to these factors, the cost associated with methanol separation and recycling in the etherification reaction represents approximately 30% of the cost of the total etherification process.

In recent years, a major development within the petroleum industry has been the discovery of the special catalytic capabilities of a family of zeolite catalyst based upon medium pore size shape selective metallosilicates. Discoveries have been made leading to a series of analogous processes drawn from the catalytic capability of zeolites. Depending upon various conditions of space velocity, temperature and pressure lower oxygenates, such as methanol can be converted in the presence of zeolite type catalyst to olefins which can oligomerize to provide gasoline or distillate or be converted further to produce aromatics. Recognizing the commonality of the feedstock and product between etherification reactions to produce high octane gasoline and zeolite catalyzed conversion reactions, interest has focused on the applicability of combined processes as an approach to advance the art in the production of high octane gasoline.

It has been discovered that under certain conditions substantial improvements in the art of high octane gasoline production can be realized in a combination or integration of etherification and aromatization processes based upon zeolite type catalyst. Accordingly, it is an object of this invention to provide a novel process for the production of high octane gasoline.

Another object of this invention is to provide a novel and cost effective process for the production of methyl tertiary alkyl ethers as octane enhancing components of high octane gasoline.

Yet a further object of the present invention is a novel process for the production of high octane gasoline through zeolite catalyzed aromatization integratd with etherification.

Yet another object of the present invention is to provide a novel process for the production of high octane gasoline rich in aromatics utilizing unreacted methanol from etherification.

SUMMARY OF THE INVENTION

An integrated process has been discovered combining the process of the etherification of iso-olefins and methanol to produce methyl tertiary alkyl ethers such as methyl tertiary butyl ether and methyl tertiary amyl ether with the process of converting olefins and paraffins to aromatics and aromatic rich gasoline in the presence of zeolite type catalyst. It has been discovered that improved yields of the desired ether products can be produced in the process of the instant invention by conducting the process in the presence of high excess methanol. Unreacted excess methanol, it has been discovered, can be passed to the aromatization conversion process for conversion to olefins and aromatics. The products of the invention include ether rich high octane gasoline and aromatics rich high octane gasoline. In the present invention excess methanol refers to a stoichiometric equivalent excess of methanol based upon the iso-olefinic content in the etherification reaction.

Most advantageously, it has been discovered that the integrated process of the present invention can be practiced using fixed, fluidized or moving catalytic bed reactors in the aromatization step. A particular advantage is presented for moving bed or fixed bed processes leading to a reduction in the complexity of moving bed or fixed bed reactors. This is achieved by introducing aromatization reactant, such as ethylene, in a mid portion of the reactor where the reactant's exothermic reaction augments the endothermic conversion of paraffins to aromatics.

More specifically, a continuous process for the production of high octane gasoline has been discovered comprising the steps of:

(a) contacting a $C_4+$ hydrocarbon feedstream containing iso-olefins and a methanol feedstream with an acid etherification catalyst under etherification conditions in an etherification zone whereby an effluent stream is produced comprising methyl tertiary alkyl ethers, unreacted methanol and hydrocarbons;

(b) separating the effluent stream whereby a separator bottom stream is produced comprising high octane ether rich $C_5+$ gasoline in an overhead stream comprising unreacted methanol and $C_5-$ hydrocarbons;

(c) passing the separator overhead stream and an aromatization hydrocarbon feedstream containing ethene rich gas and $C_3$'s to an olefins and paraffins fixed, fluid or moving bed aromatization zone under aromatization conditions in contact with medium pore size shape selective metallosilicate catalyst having the structure of ZSM-5 whereby a high octane $C_5+$ gasoline is produced and hydrogen rich fuel gas.

DETAILED DESCRIPTION OF THE INVENTION

Figure 1:
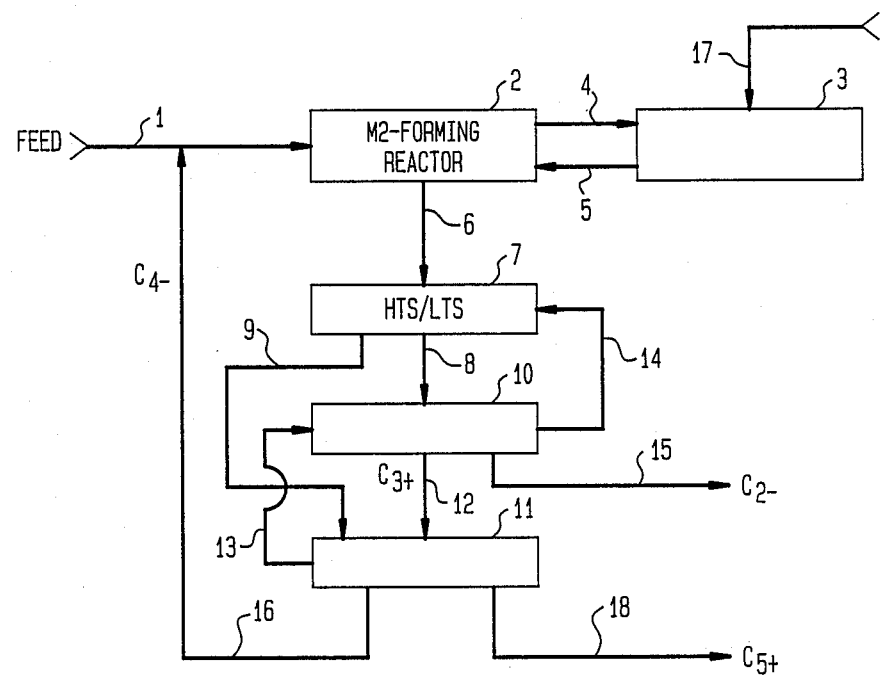
FIG. 1 is a schematic diagram of the M2 FORMING aromatization process.

In the preferred embodiments of this invention methanol is reacted with a hydrocarbon feedstock containing olefins and particularly isoolefins such as isobutene to produce methyl tertiary butyl ether and other ethers.

Methanol may be readily obtained from coal by gasification to synthesis gas and conversion of the synthesis gas to methanol by well established industrial processes. As an alternative, the methanol may be obtained from natural gas by other conventional processes, such as steam reforming or partial oxidation to make the intermediate syngas. The etherification catalyst employed is preferably an ion exchange resin in the hydrogen form; however, any suitable acidic catalyst may be employed. Varying degrees of success are obtained with acidic solid catalysts; such as, sulfonic acid resins, phosphoric acid modified kieselguhr, silica alumina and acid zeolites. Typical hydrocarbon feedstock materials for etherification reactions include olefinic streams, such as FCC light naphtha and butanes rich in iso-olefins. These aliphatic streams are produced in petroleum refineries by catalytic cracking of gas oil or the like.

The major reaction units are operatively connected in a synergistic combination whereby etherification reaction effluent is utilized to provide additional reactive methanol by zeolite catalysis to provide conversions to olefins and aromatics. Advantageously, at least a portion of the gasoline range hydrocarbons are recovered from etherification with $C_5+$ ether octane enhancers useful in quality motor fuels. MTBE and TAME are preferred ethers.

ETHERIFICATION OPERATION

The reaction of methanol with isobutylene and isoamylenes at moderate conditions with a resin catalyst is known technology, as provided by R. W. Reynolds, et al., *The Oil and Gas Journal*, June 16, 1975, and S. Pecci and T. Floris, *Hydrocarbon Processing*, December 1977. An article entitled "MTBE and TAME—A Good Octane Boosting Combo," by J. D. Chase, et al., *The Oil and Gas Journal*, Apr. 9, 1979, pages 149–152, discusses the technology. A preferred catalyst is a bifunctional ion exchange resin which etherifies and isomerizes the reactant streams. A typical acid catalyst is Amberlyst 15 sulfonic acid resin.

MTBE and TAME are known to be high octane ethers. The article by J. D. Chase, et al., *Oil and Gas Journal*, Apr. 9, 1979, discusses the advantages one can achieve by using these materials to enhance gasoline octane. The octane blending number of MTBE when 10% is added to a base fuel (R+O=91) is about 120. For a fuel with a low motor rating (M+O=83) octane, the blending value of MTBE at the 10% level is about 103. On the other hand, for an (R+O) OF 95 octane fuel, the blending value of 10% MTBE is about 114.

Processes for producing and recovering MTBE and other methyl tertiary alkyl ethers from $C_4$–$C_7$ iso-olefins are known to those skilled in the art, such as disclosed in U.S. Pat. Nos. 4,544,776 (Osterburg, et al.) and 4,603,225 (Colaianne et al.). Various suitable extraction and distillation techniques are known for recovering ether and hydrocarbon streams from etherification effluent.

AROMATIZATION OPERATION (M-2 FORMING)

The light aliphatic hydrocarbon conversion process to form aromatics, "M-FORMING", may utilize conversion conditions described in U.S. Pat. No. 3,760,024 (Cattanach); 3,845,150 (Yan and Zahner); 4,097,367 (Haag et al.); 4,350,835 (Chester et al.); 4,590,323 (Chu); and 4,629,818 (Burress) incorporated herein by reference. A feedstream consisting essentially of $C_2$–$C_4$ paraffins and/or olefins (ethane, propane, butane, ethylene, propylene, butane, isobutylene, isobutane and mixtures thereof) is contacted with a ZSM-5 type zeolite at a temperature from about 530° to 850° C. and a pressure ranging from 0–2000 kPa. Optionally, the feedstream can contain $C_4+$ paraffinic and/or olefinic hydrocarbons.

Hydrogen-to-hydrocarbon ratios are from 0 to 20 and weight hourly space velocity from 0.1 to 500. Preferred operating conditions are temperatures from 550° to 650° C. and pressures from about 100–1000 kpa, absence of hydrogen and a WHSV of from 0.5 to 20. The aromatics which are produced are predominantly $C_6$–$C_{10}$ aromatics.

Referring to FIG. 1, a schematic flow diagram of a typical M2-FORMING aromatization process is shown. An essentially paraffinic/olefinic feed (1) is passed to an M2-FORMING reactor vessel (2) containing ZSM-5 catalyst. A catalyst regenerator vessel is connected therewith (4,5) for recycling and regenerating ZSM-5 catalyst, and adding fresh catalyst (17) as appropriate. The light aliphatic, paraffinic/olefinic feed is converted under the aforenoted reaction conditions to produce a mixed product effluent stream comprising light gases such as hydrogen and methane, unconverted $C_2$–$C_4$ light hydrocarbons and $C_5+$ aromatics. After cooling the effluent stream (not shown) the products are passed (6) to high temperature and low temperature separators, where a low temperature product fraction is passed (8) to an absorber/deethanizer system (10) while a high temperature fraction is passed (9) to a debutanizer (11) in addition to a $C_3+$ fraction (12) from the deethanizer. A recycle stream (14) is taken from the deethanizer/absorber system along with a $C_2-$ product stream (15). In addition to recycle stream (13), the debutanizer provides the aromatics $C_5+$ product stream (18), and a $C_4$-unconverted hydrocarbon feedstream (1).

CATALYST

With respect to the preferred aromatization catalysts in the instant invention, recent developments in zeolite technology have provided a group of medium pore siliceous materials having similar pore geometry. Most prominent among these intermediate pore size zeolites is ZSM-5, which is usually synthesized with Bronsted acid active sites by incorporating a tetrahedrally coordinated metal, such as Al, Ga, or Fe, within the zeolytic framework. These medium pore zeolites are favored for acid catalysis; however the advantages of ZSM-5 structures may be utilized by employing highly siliceous materials or crystalline metallosilicate having one or more tetrahedral species having varying degrees of acidity. ZSM-5 crystalline structure is readily recognized by its X-ray diffraction pattern, which is described in U.S. Pat. No. 3,702,866 (Argauer, et al.), incorporated herein by reference.

The shape-selective medium pore metallosilicate catalysts preferred for use herein include the crystalline aluminosilicate and/or gallosilicate zeolites having a silica to alumina molar ratio of at least 12, a constraint index of about 1 to 12, and acid cracking activity (alpha value) of at least 20, preferably about 50–300. Representative of the ZSM-5 type zeolites are ZSM-5, ZSM-11, ZSM-12, ZSM-21, ZSM-23, ZSM-35, and ZSM-38 and other similar materials.

ZSM-11 is more particularly described in U.S. Pat. No. 3,709,979, the entire contentss of which is incorporated herein by reference. ZSM-12 is more particularly described in U.S. Pat. No. 3,832,449, the entire contens of which is incorporated herein by reference. ZSM-23 is more particularly described in U.S. Pat. No. 4,076,842, the entire content of which is incorporated herein by reference. ZSM-35 is more particularly described in U.S. Pat. No. 4,016,245, the entire content of which is incorporated herein by reference. ZSM-38 is more particularly described in U.S. Pat. No. 4,046,859, the entire content of which is incorporated herein by reference.

A suitable shape selective medium pore catalyst for the conversion of light aliphatics to aromatics is a small crystal HZSM-5 zeolite with a silica:alumina ratio of 70:1 and an alumina binder in the form of crystal extrudates of about 1–5MM. Unless otherwise stated in this description, the catalyst shall consist essentially of ZSM-5, which has a crystallite size of about 0.02 to 0.05 micron.

An important characteristic of the crystal structure of the zeolites for use herein is that they provide constrained access to, and egress from, the intracrystalline free space by virtue of having a pore dimension greater than about 5 Angstroms and pore windows of about a size such as would be provided by a 10-membered ring of oxygen atoms. It is to be understood, of course, that these rings are formed by the regular disposition of tetrahedra making up the anionic framework of the crystalline aluminosilicates, the oxygen atoms themselves being bonded to the silicon or aluminum atoms at the center of the tetrahedra. Briefly, the preferred type catalysts useful in this invention possess, in combination: a silica-to-alumina ratio of at least about 12; and a structure providing constrained access to the crystalline free space.

The silica-to-alumina ratio referred to may be determined by conventional analysis. This ratio is meant to represent, as closely as possible, the ratio in the rigid anionic framework of the zeolite crystal and to exclude aluminum in the binder or in cationic or other forms within the channels. Although catalysts with a silica-to-alumina ratio of at least 12 are useful, it is preferred to use catalysts having higher ratios of about 20:1 to 200:1, preferably about 30–70:1. These zeolites, in particular ZSM-5, may include metals such as Zn, Cu, Ga and Pt.

Constrained access to the crystalline free space of ZSM-5 and other ZSM-5 type catalysts is measured by the determination of a "constraint index." Catalysts suitable for the present invention are those having a constraint index in the approximate range of 1 to 12, as determined by the test procedure of U.S. Pat. No. 4,016,218, incorporated herein in its entirety by reference.

Figure 2:
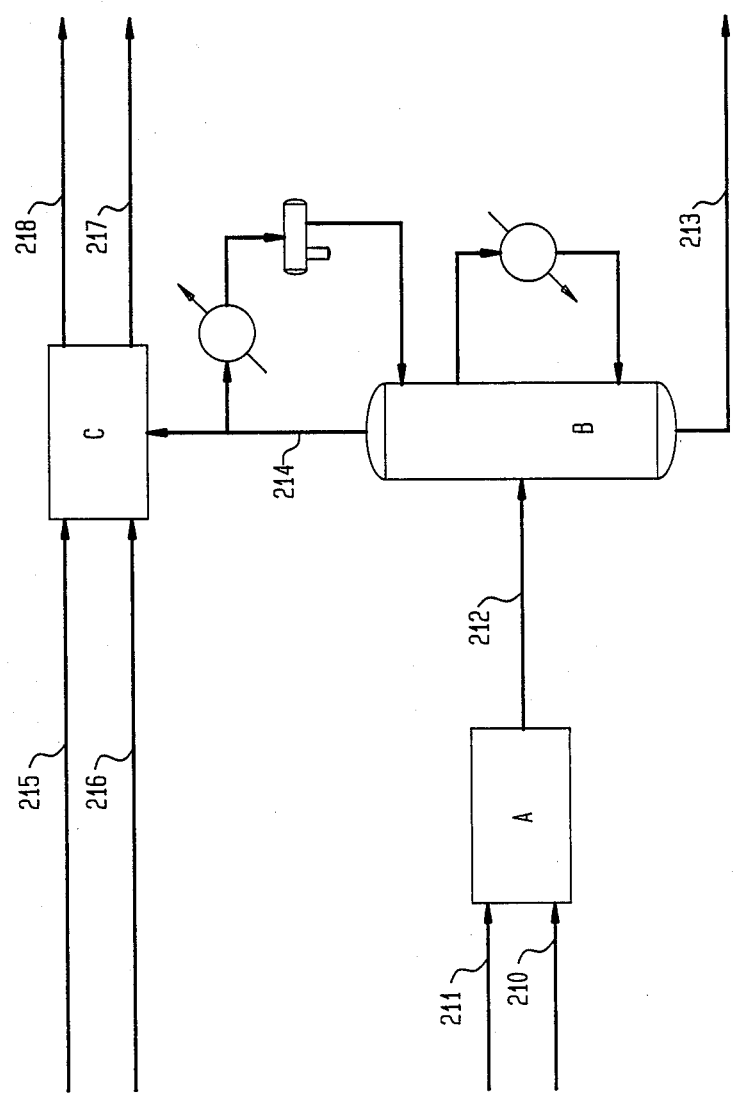
FIG. 2 is a schematic flow diagram of the integrated process of the present invention.

Referring now to FIG. 2, a schematic process flow diagram illustrating the instant invention is presented. Methanol 210 and a hydrocarbon feedstream 211 containing iso-olefins are passed to an etherification reaction unit A. On a stoichiometric equivalencies basis, between 2 and 200% excess methanol is passed to the etherification reaction unit based on the iso-olefin reactant content of hydrocarbon feedstream 211. Preferably, the excess methanol is about 20% Etherification is conducted in unit A according to known procedures, as noted heretofore. The reaction products comprise a mixture of ethers, most importantly methyl tertiary alkyl ethers, such as methyl tertiary butyl ether (MTBE) and methyl tertiary amyl ether (TAME). Etherification reaction products include those unreactive hydrocarbon products originally present in the feedstream 211 as well as unreacted isoolefins and unreacted methanol. The reaction products, in the form of etherification effluent stream 212 are passed to a fractionation separator, typically a debutanizer B which carries out some depentanizing. In the debutanizer the effluent stream is separated into a bottom stream 213 and an overhead stream 214. A major portion of stream 213 consists of ether rich $C_5+$ gasoline. The ethers in stream 213 include methyl tertiary alkyl ethers such as methyl tertiary butyl ether and methyl tertiary amyl ether. Stream 214 comprises unreacted methanol and $C_5-$ hydrocarbons. A portion of this stream is recycled to a top section of the debutanizer as a reflux stream. The debutanizer overhead 214 is passed to an M2-FORMING unit along with an ethene rich gas feedstream 215 and a $C_3$ feedstream 216. In a particular embodiment on the present invention the ratio of olefin to paraffin in the feedstream to the M2-FORMING unit is maintained in a ratio sufficient to support a generally exothermic reaction in the M2-Forming unit. Olefins, it is known, react exothermically under aromatization conditions while paraffins react endothermically. Therefore, the olefin stream can be adjusted to provide a sufficient quantity of olefin feed to compensate for the endothermic character of the paraffin conversion to aromatics. The aromatization conditions in the M2-forming unit C are described herein before.

As previously noted the aromatization reaction is conducted in contact with zeolite type catalyst, particularly ZSM-5. The catalyst bed may be a fixed bed, a fluid bed or a moving bed. The moving bed configuration applicable to the invention described herein is well known in the art as described in U.S. Pat. No. 4,642,402 and U.S. Pat. No. 4,677,235 incorporated herein in their entirety by reference.

The products of the M2-FORMING aromatization reaction of the present invention include a major portion of $C_5+$ gasoline 217 in FIG. 2 and hydrogen rich fuel gas 218. The $C_6+$ gasoline fraction is a high octane gasoline fraction rich in aromatics.

In the instant invention, it has been discovered that the ethene hydrocarbon feed to the M2-FORMING unit is advantageously introduced into the reactor in a mid-section of the reactor when the reactor is a moving bed or fixed bed reactor. In this configuration, in addition to contributing to the exothermic nature of the aromatization reaction, the light olefins in the presence of ZSM-5 alkylate the aromatics formed in the aromatization unit thereby enriching the reaction products in terms of their octane enhancing qualities.

While the instant invention has been described by specific examples and embodiments, there is no intent to limit the inventive concept except as set forth in the following claims.

What is claimed is:

1. A continuous process for the production of aromatics-rich high octane gasoline and ether-rich high octane gasoline, comprising the steps of:
   (a) contacting a $C_4+$ hydrocarbon feedstream containing iso-olefins and excess methanol based on said iso-olefins with an acid etherification catalyst under etherification conditions in an etherification zone whereby an effluent stream is produced comprising methyl tertiary alkyl ethers, unreacted methanol and hydrocarbons;
   (b) distilling said effluent stream whereby a distillate bottom stream is produced comprising high octane ether-rich $C_5+$ gasoline and a distillate overhead stream comprising unreacted methanol and $C_5-$ hydrocarbons;
   (c) passing said distillate overhead stream and an aromatization hydrocarbon feedstream comprising an ethene rich gas feedstream and $C_3$ hydrocarbons to an olefins and paraffins fixed, fluid or moving bed aromatization zone under aromatization conditions in contact with medium pore size shape selective metallosilicate catalyst having the structure of ZSM-5 whereby a high octane aromatics-rich $C_5+$ gasoline is produced and hydrogen-rich fuel gas.

2. The process of claim 1 wherein said methanol feed stream comprises a stochiometric excess of methanol between 2 to 200 wt.% based on iso-olefins in said hydrocarbon feed stream.

3. The process of claim 2 wherein said excess methanol is about 20 wt.%.

4. The process of claim 1 wherein said metallosilicate catalyst comprises gallium, iron or aluminum containing metallosilicate.

5. The process of claim 1 wherein said metallosilicate catalyst comprises ZSM-5.

6. The process of claim 1 wherein said aromatization zone conditions comprise temperature between 530° to 850° C. and pressure between 0 and 2000 kPa.

7. The process of claim 1 wherein said aromatization conditions comprise temperature about 600° C. and pressure about 600 kPa.

8. The process of claim 1 wherein said methyl tertiary alkyl ethers comprise methyl tertiary butyl ether and methyl tertiary amyl ether.

9. The process of claim 1 wherein said aromatization feedstream comprises olefins in an amount sufficient to provide an overall exothermic aromatization heat of reaction.

10. The process of claim 9 comprising feeding said olefins to a middle portion of a moving bed aromatization reactor whereby alkylation of aromatics is increased.

11. The process of claim 1 wherein said aromatization feedstream consists essentially of paraffins and said aromatization zone comprises a moving bed aromatization zone.

* * * * *